US010955634B2

(12) United States Patent
Giraud et al.

(10) Patent No.: US 10,955,634 B2
(45) Date of Patent: Mar. 23, 2021

(54) SPLITTER MODULE WITH INTERLOCKING FEATURE FOR STACKING AND INSTALLATION

(71) Applicant: CORNING RESEARCH & DEVELOPMENT CORPORATION, Corning, NY (US)

(72) Inventors: William Julius McPhil Giraud, Azle, TX (US); Kristine Alaina Johnson, Keller, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/683,418

(22) Filed: Nov. 14, 2019

(65) Prior Publication Data

US 2020/0174212 A1 Jun. 4, 2020

Related U.S. Application Data

(60) Provisional application No. 62/775,003, filed on Dec. 4, 2018.

(51) Int. Cl.
*G02B 6/00* (2006.01)
*G02B 6/44* (2006.01)

(52) U.S. Cl.
CPC ......... *G02B 6/4453* (2013.01); *G02B 6/4471* (2013.01)

(58) Field of Classification Search
CPC .. G02B 6/4452; G02B 6/3897; G02B 6/4471; G02B 6/4453; G02B 6/00
See application file for complete search history.

(56) References Cited

U.S. PATENT DOCUMENTS

| 8,811,791 | B2 * | 8/2014 | Solheid | G02B 6/3893 |
| | | | | 385/135 |
| 9,274,300 | B2 * | 3/2016 | Miller | G02B 6/4452 |
| 10,514,519 | B2 | 12/2019 | Larsson et al. | |
| 2010/0166377 | A1 | 7/2010 | Nair et al. | |
| 2010/0278498 | A1 * | 11/2010 | Zimmel | G02B 6/2938 |
| | | | | 385/135 |
| 2015/0355428 | A1 | 12/2015 | Leeman et al. | |
| 2019/0025533 | A1 * | 1/2019 | Larsson | G02B 6/4454 |

OTHER PUBLICATIONS

International Search Report and Written Opinion of the International Searching Authority; PCT/US2019/062923; dated May 14, 2020; 11 Pages; European Patent Office.

* cited by examiner

*Primary Examiner* — Jennifer Doan
(74) *Attorney, Agent, or Firm* — Grant A. Gildehaus

(57) ABSTRACT

A fiber optic splitter module includes a body including a front wall, a rear wall, and first and second side walls together at least partially defining an interior space. The first side wall includes a tongue extending longitudinally along the first side wall, and the second side wall includes a first groove that is complementary to the tongue. The fiber optic splitter module also includes an optical splitter positioned in the interior space, an input fiber extending through the front wall or the rear wall into the interior space and optically coupled to the optical splitter, and a plurality of output fibers extending through the front wall or the rear wall into the interior space and optically coupled to the optical splitter.

23 Claims, 12 Drawing Sheets

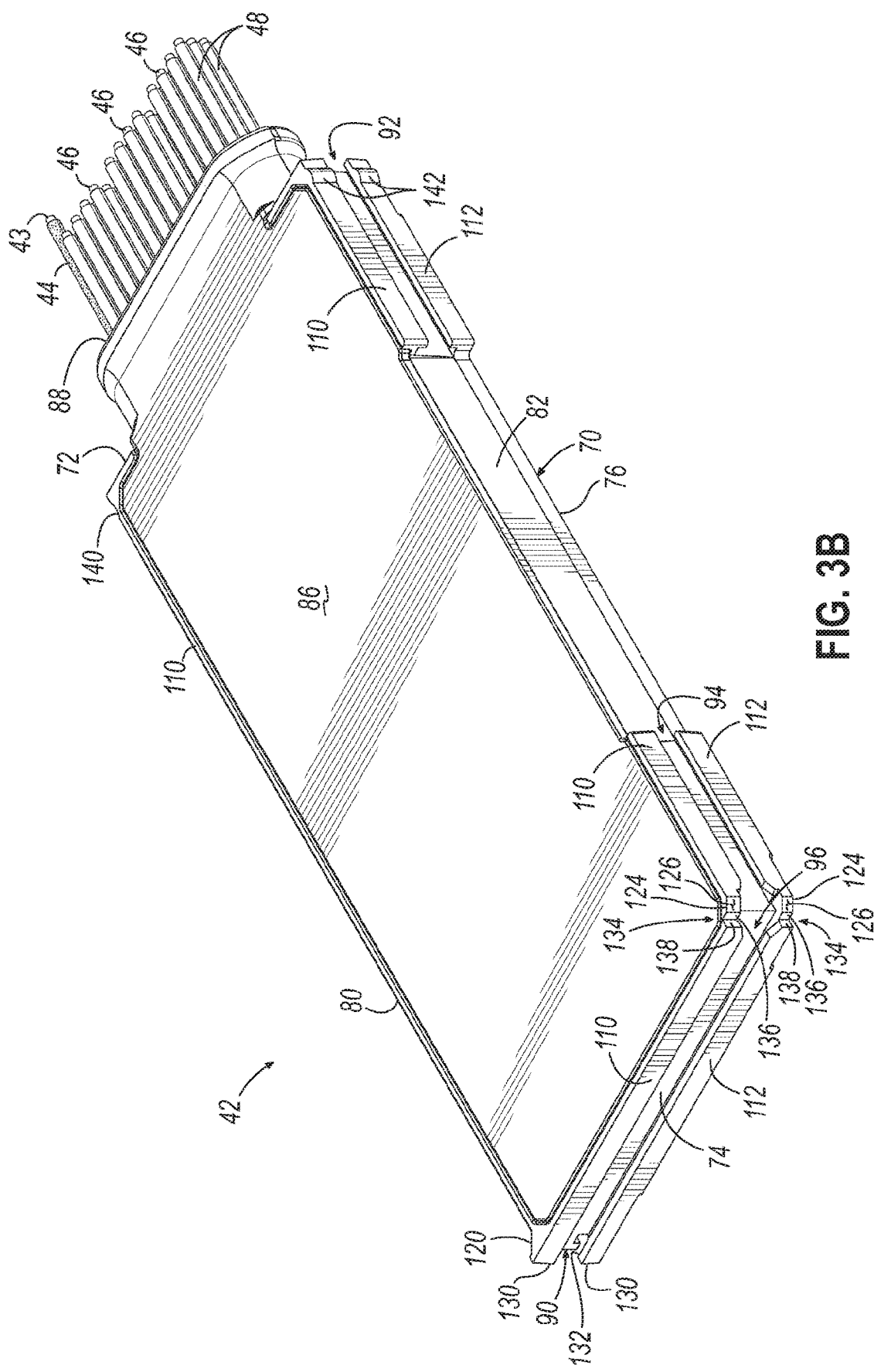

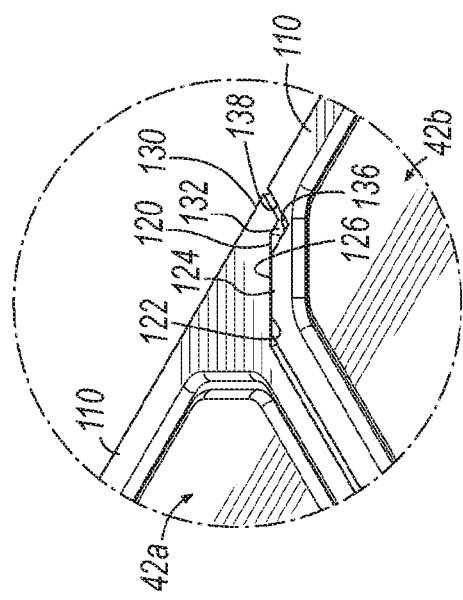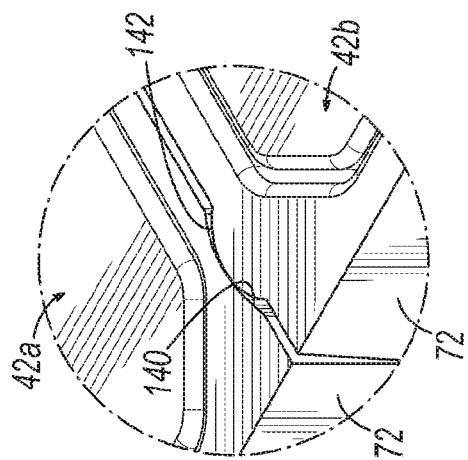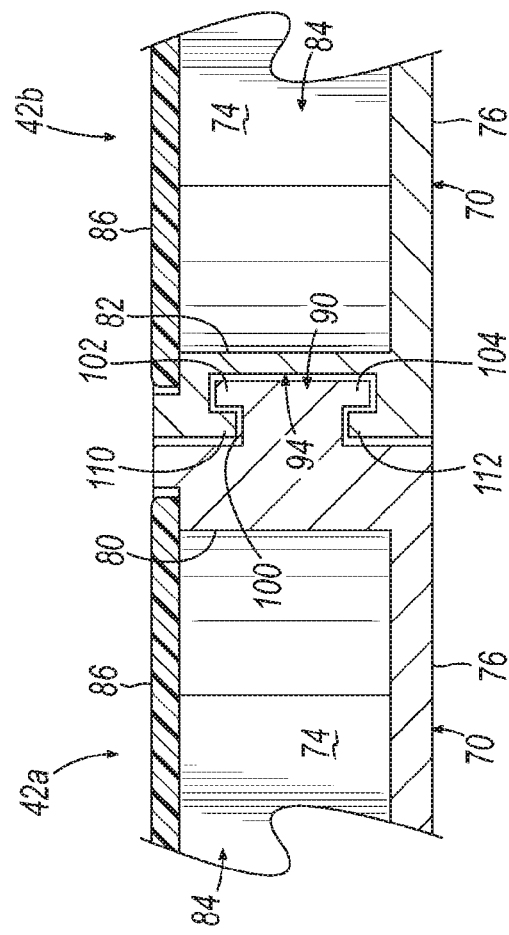

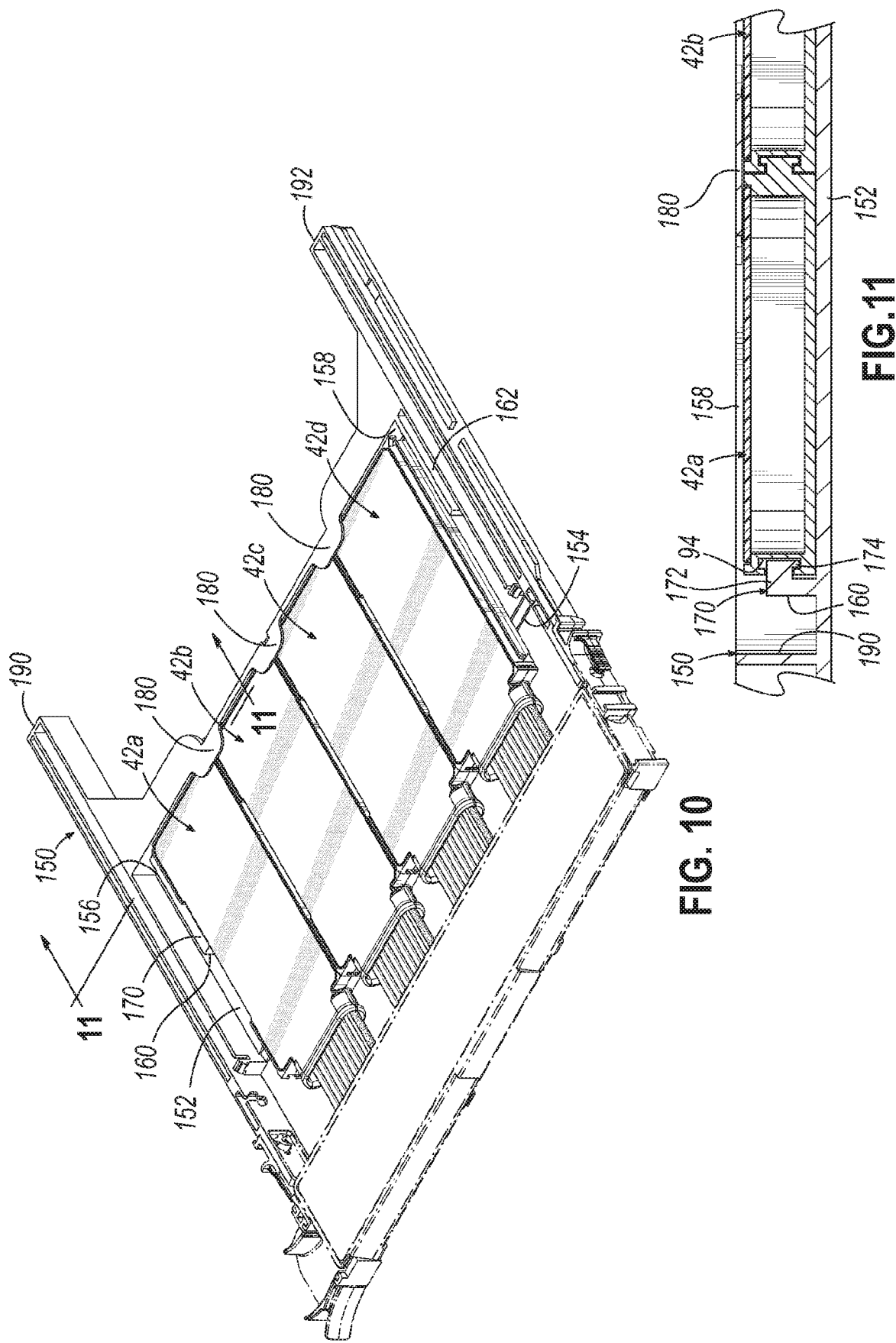

SPLITTER MODULE WITH INTERLOCKING FEATURE FOR STACKING AND INSTALLATION

PRIORITY APPLICATION

This application claims the benefit of priority of U.S. Provisional Application No. 62/775,003, filed on Dec. 4, 2018, the content of which is relied upon and incorporated herein by reference in its entirety.

TECHNICAL FIELD

This disclosure relates generally to optical connectivity, and more particularly to a fiber optic splitter module having at least one interlocking feature for stacking and installation.

BACKGROUND

Optical fibers are useful in a wide variety of applications, including the telecommunications industry for voice, video, and data transmissions. The benefits of optical fiber are well known and include higher signal-to-noise ratios and increased bandwidth compared to conventional copper-based transmission technologies. To meet modern demands for increased bandwidth and improved performance, telecommunication networks are increasingly providing optical fiber connectivity closer to end subscribers. These initiatives include fiber-to-the-node (FTTN), fiber-to-the-premises (FTTP), fiber-to-the-home (FTTH), and the like (generally described as FTTx).

In an FTTx network, fiber optic cables are used to carry optical signals to various distribution points and, in some cases, all the way to end subscribers. For example, FIG. 1 is a schematic diagram of an exemplary FTTx network 10 that distributes optical signals generated at a switching point 12 (e.g., a central office of a network provider) to subscriber premises 14. Optical line terminals (OLTs; not shown) at the switching point 12 convert electrical signals to optical signals. Fiber optic feeder cables 16 then carry the optical signals to various local convergence points 18, which act as locations for splicing and making cross-connections and interconnections. The local convergence points 18 often include splitters to enable any given optical fiber in the fiber optic feeder cable 16 to serve multiple subscriber premises 14. As a result, the optical signals are "branched out" from the optical fibers of the fiber optic feeder cables 16 to optical fibers of distribution cables 20 that exit the local convergence points 18.

At network access points closer to the subscriber premises 14, some or all of the optical fibers in the distribution cables 20 may be accessed to connect to one or more subscriber premises 14. Drop cables 22 extend from the network access points to the subscriber premises 14, which may be single-dwelling units (SDU), multi-dwelling units (MDU), businesses, and/or other facilities or buildings. A conversion of optical signals back to electrical signals may occur at the network access points or at the subscriber premises 14.

There are many different network architectures, and the various tasks required to distribute optical signals (e.g., splitting, splicing, routing, connecting subscribers) can occur at several locations. Regardless of whether a location is considered a local convergence point, network access point, subscriber premise, or something else, fiber optic equipment is used to house components that carry out one or more of the tasks. The term "terminal" will be used in this disclosure to generically refer to such equipment, which may include fiber distribution hubs (FDH), cabinets, closures, network interface devices, etc.

Terminals at locations that split optical signals typically include splitter modules for this task. Each splitter module includes at least one input fiber whose signals are split between a plurality of output fibers. Conventional splitter modules, such as Planar Lightweight Circuit (PLC) splitter modules, are generally rectangular in shape with the input and output fibers located on one side thereof. Such splitter modules are typically mounted in the terminal using hooks, screws, or other fasteners.

Space is often at a premium in terminals, especially when the terminals include a large number of components and cables. Accommodating splitter modules can be challenging when designing a terminal, particularly when a fairly large quantity, such as dozens or hundreds, of optical fibers are involved. The space within a terminal is typically limited because there is also a need to properly route and store cables, to accommodate components for splicing, storing unused connectors, or the like, and to allow technicians to effectively install or operate the components. Making terminals larger may not necessarily help with organization and may increase the likelihood of customers considering the equipment to be obtrusive.

Conventional splitter module mounting techniques fail to provide space-efficient mounting. For example, conventional splitter modules are configured in a variety of particular shapes and sizes, and with various different mounting features, such that each splitter module to be positioned within a terminal may have a unique footprint requiring a unique positioning, orientation, and/or mounting hardware which may interfere with adjacent splitter modules or other components. This can result in a complex, disordered arrangement of splitter modules and their associated fibers that can be difficult to manage in the relatively small space provided by the terminal.

SUMMARY

In one embodiment, a fiber optic splitter module includes a body including a front wall, a rear wall, and first and second side walls together at least partially defining an interior space. The first side wall includes a tongue extending longitudinally along the first side wall, and the second side wall includes a first groove that is complementary to the tongue. The fiber optic splitter module also includes an optical splitter positioned in the interior space, an input fiber extending through the front wall or the rear wall into the interior space and optically coupled to the optical splitter, and a plurality of output fibers extending through the front wall or the rear wall into the interior space and optically coupled to the optical splitter. The fiber optic splitter module may further include a port positioned on the front wall or the rear wall, wherein the input fiber or the plurality of output fibers extends through the port and into the interior space. In addition or alternatively, the rear wall may include a second groove that is complementary to the tongue.

One of the first or second side walls may include a stop that includes a first surface positioned at a first distance from the front wall, the other of the first or second side walls may include a truncation that includes a second surface positioned at a second distance from the front wall, and the first and second distances may be substantially the same. In addition or alternatively, one of the first or second side walls may include a detent spaced a first distance from the front wall, the other of the first or second side walls may include an indent that is complementary to the detent and that is spaced a second distance from the front wall, and the first and second distances may be substantially the same.

In another embodiment, a pair of interlocking fiber optic splitter modules includes a first fiber optic splitter module including a first body having a first front wall, a first rear wall, and first and second side walls together at least partially defining a first interior space. The first side wall includes a first tongue and the second side wall includes a first groove. The first fiber optic splitter module also includes a first optical splitter positioned in the first interior space, a first input fiber extending through the first front wall or the first rear wall into the first interior space and optically coupled to the first optical splitter, and a plurality of first output fibers extending through the first front wall or the first rear wall into the first interior space and optically coupled to the first optical splitter. The pair of interlocking fiber optic splitter modules further includes a second fiber optic splitter module including a second body having a second front wall, a second rear wall, and third and fourth side walls together at least partially defining a second interior space. The third side wall includes a second tongue and the fourth side wall includes a second groove. The second fiber optic splitter module also includes a second optical splitter positioned in the second interior space, a second input fiber extending through the second front wall or the second rear wall into the second interior space and optically coupled to the second optical splitter, and a plurality of second output fibers extending through the second front wall or the second rear wall into the second interior space and optically coupled to the second optical splitter. The first tongue is configured to matingly and slidingly engage with the second groove to selectively interlock the first fiber optic splitter module with the second fiber optic splitter module in a first position, and the second tongue is configured to matingly and slidingly engage with the first groove to selectively interlock the first fiber optic splitter module with the second fiber optic splitter module in a second position.

One of the first or second side walls of the first fiber optic splitter module may include a stop that includes a first surface positioned at a first distance from the first front wall, one of the third or fourth side walls of the second fiber optic splitter module may include a truncation that includes a second surface positioned at a second distance from the second front wall, and the first and second surfaces may be configured to limit relative longitudinal movement between the first and second fiber optic splitter modules. In one embodiment, the first and second distances are substantially the same. In addition or alternatively, one of the first or second side walls of the first fiber optic splitter module may include a detent that is positioned at a first distance from the first front wall, one of the third or fourth side walls of the second fiber optic splitter module may include an indent that is complementary to the detent and that is positioned at a second distance from the second front wall, and the detent and the indent may be configured to cooperate with each other to selectively lock a positioning of the first and second fiber optic splitter modules relative to each other. In one embodiment, the first and second distances are substantially the same. In addition or alternatively, the detent may be configured to provide a snap-fit with the indent.

In another embodiment, a fiber optic terminal includes a frame including at least one frame wall and at least one rail mounted to the at least one frame wall. The at least one rail includes at least one interlocking feature extending longitudinally along the at least one rail. The fiber optic terminal further includes at least one fiber optic splitter module including a body having a front wall, a rear wall, and first and second side walls together at least partially defining an interior space. The first side wall includes a tongue extending longitudinally along the first side wall, and the second side wall includes a first groove that is complementary to the tongue. The at least one fiber optic splitter module also includes an optical splitter positioned in the interior space, an input fiber extending through the front wall or the rear wall into the interior space and optically coupled to the optical splitter, and a plurality of output fibers extending through the front wall or the rear wall into the interior space and optically coupled to the optical splitter. The at least one interlocking feature of the at least one rail is configured to matingly and slidingly engage with the tongue or the first groove of the at least one fiber optic splitter module. The at least one interlocking feature of the at least one rail may include at least one tongue extending longitudinally along the at least one rail, and the rear wall of the at least one fiber optic splitter module may include at least one second groove extending longitudinally along the rear wall and configured to matingly and slidingly engage with the at least one tongue of the at least one rail.

The at least one rail may include at least two oppositely disposed rails. In addition or alternatively, each rail of the at least one rail may include at least two adjacent partitions extending longitudinally along the rail to define a space configured to receive a portion of the body of the at least one fiber optic splitter module. In one embodiment, the at least one frame wall includes a top frame wall and the at least one rail includes a top rail mounted to the top frame wall, and the at least one fiber optic splitter module extends downwardly from the top rail. In another embodiment, the at least one frame wall includes a bottom frame wall and the at least one rail includes a bottom rail mounted to the bottom frame wall, and the at least one fiber optic splitter module extends upwardly from the bottom rail. In addition or alternatively, the at least one fiber optic splitter module may include a pair of fiber optic splitter modules interlocked by the tongue of one of the fiber optic splitter modules cooperating with the first groove of the other of the fiber optic splitter modules. In one embodiment, the at least one rail further includes at least one pair of mounting prongs and the at least one frame wall includes at least one aperture configured to receive the at least one pair of mounting prongs for mounting the at least one rail to the at least one frame wall.

The fiber optic terminal may further include an adapter cradle slidingly engaged with the at least one rail. The adapter cradle includes a cradle body including a rear inner surface and first and second side inner surfaces together at least partially defining a cavity configured to receive the body of the at least one fiber optic splitter module. One of the first or second side inner surfaces includes at least one interlocking feature extending longitudinally along the first or second side inner surface and configured to matingly and slidingly engage with the tongue or the first groove of the at least one fiber optic splitter module. One of the first or second side inner surfaces of the adapter cradle may include an indent, one of the first or second side walls of the at least one fiber optic splitter module may include a detent that is complementary to the indent, and the indent and the detent may be configured to cooperate with each other to selectively lock a positioning of the adapter cradle and the at least one fiber optic splitter module relative to each other.

The fiber optic terminal may also include a tray mounted to the frame. The tray includes a platform extending from a front end to a rear end and configured to cooperate with the body of the at least one fiber optic splitter module. The tray also includes at least one side wall extending along the platform and including a bracket extending longitudinally along the bracket and configured to matingly and slidingly engage with the first groove of the at least one fiber optic splitter module. The tray may include a rear wall extending along the rear end of the platform and configured to cooperate with the rear wall of the at least one fiber optic splitter module, and at least one tab extending from the rear wall of the tray toward the front end of the platform and spaced apart from the platform to define a space for receiving a portion of the at least one fiber optic splitter module.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 3B is a rear perspective view of the splitter module of FIG. 3A.

FIG. 7 is a cross sectional view of the pair of splitter modules taken along section line 7-7 in FIG. 6.

FIG. 8 is a detail view of the pair of splitter modules taken in area 8 of FIG. 6.

FIG. 9 is a detail view of the pair of splitter modules taken in area 9 of FIG. 6.

FIG. 10 is a perspective view of a plurality of splitter modules interlocked with each other and mounted to a tray.

FIG. 11 is a cross sectional view of the splitter modules and tray taken along section line 11-11 in FIG. 10.

DETAILED DESCRIPTION

Various embodiments will be further clarified by examples in the description below. In general, the description relates to components that may be used in fiber optic networks to mount splitters or splitter modules in a space efficient manner.

The components may be used in FTTx networks, such as the FTTx network 10 (FIG. 1) such as in terminals at local convergence points 18 or network access points, or even in enterprise networks, such as in data center environments. Thus, although the components may be described in connection with an exemplary terminal below, this is merely to facilitate discussion. The components may in fact be used in a wide variety of different equipment for all different types of fiber optic networks.

Figure 1:
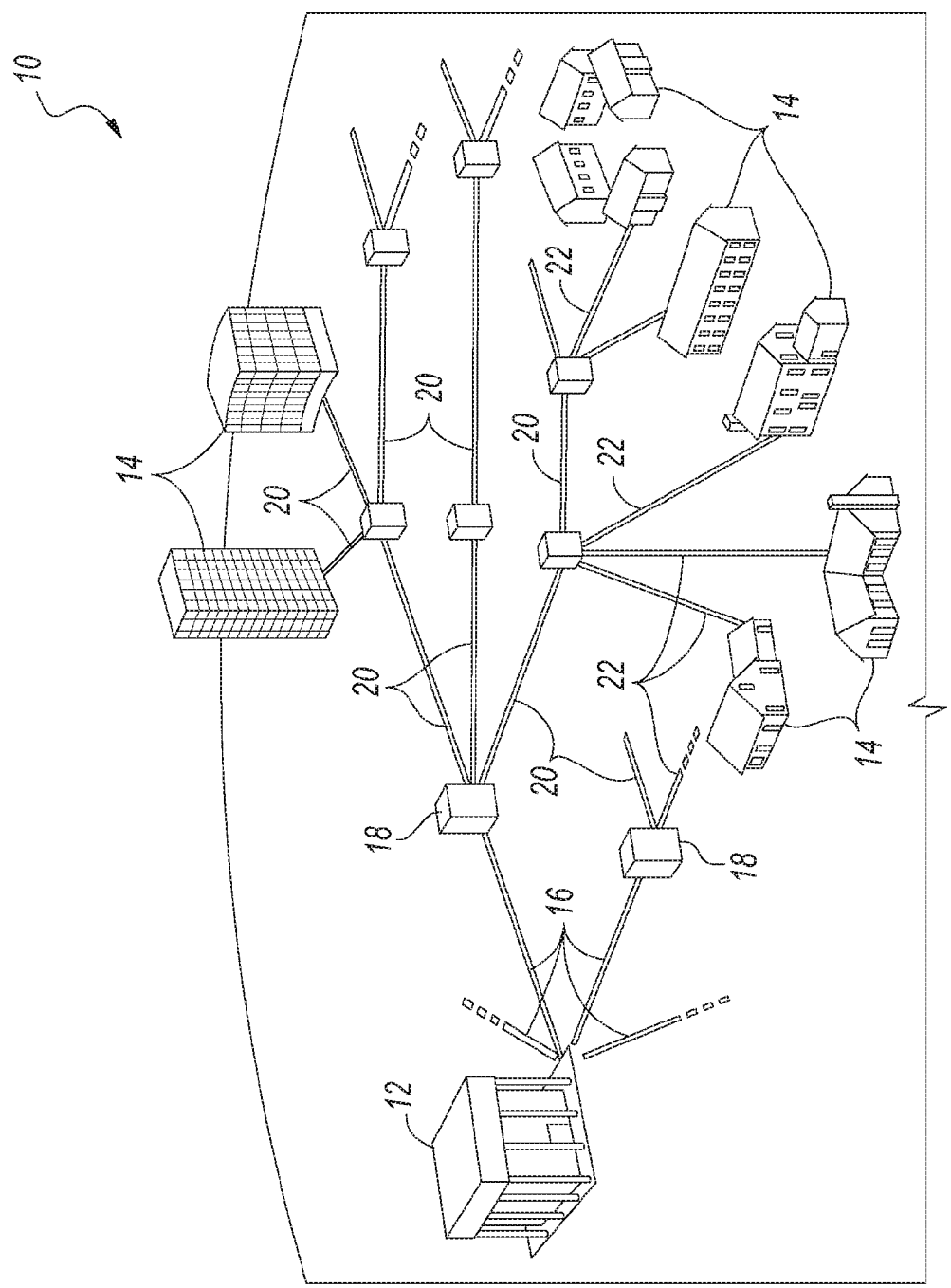
FIG. 1 is a schematic diagram of an example FTTx network.
Figure 2:
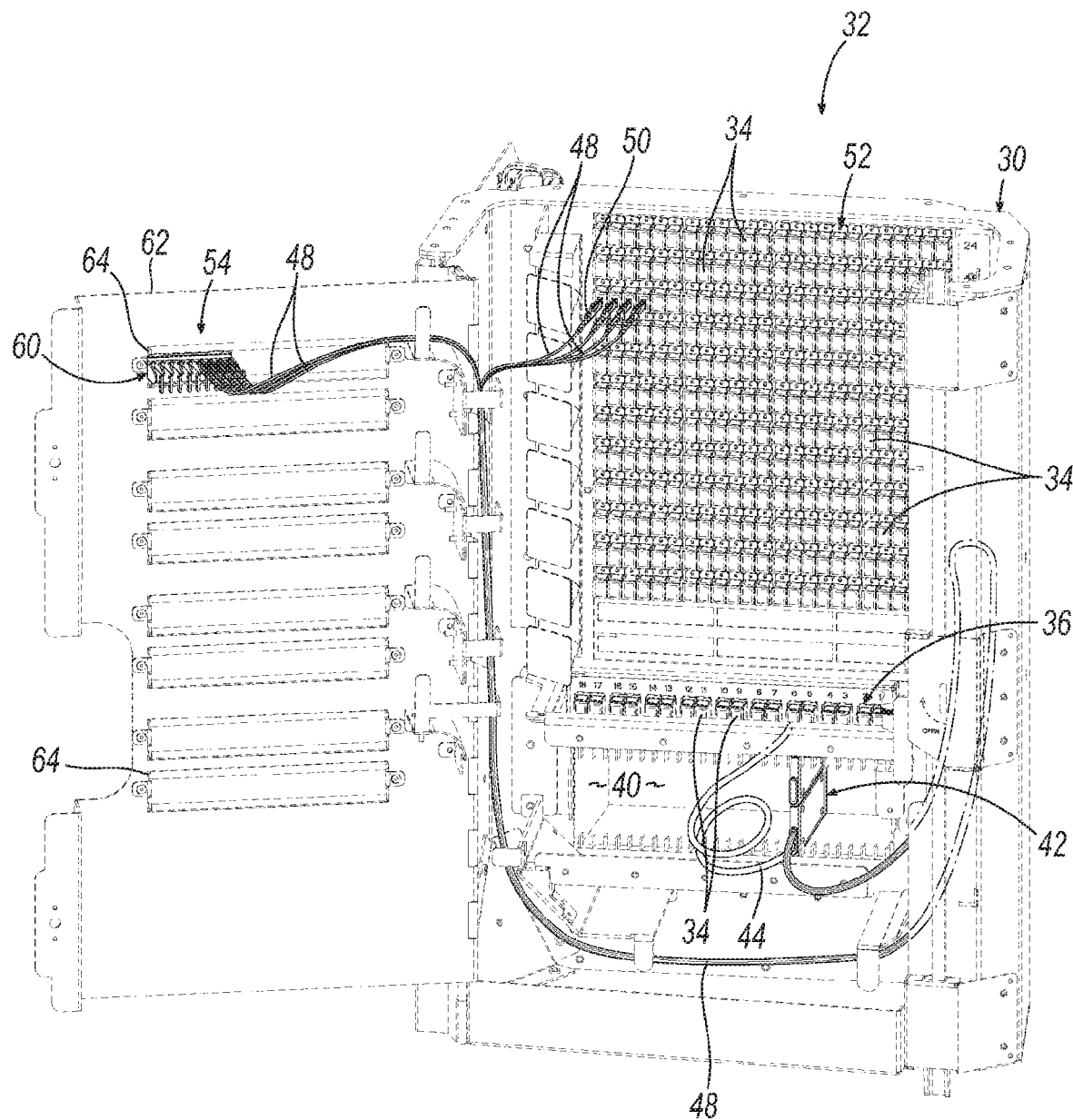
FIG. 2 is a perspective view of one embodiment of a frame for a terminal.

With this in mind, FIG. 2 illustrates one example of frame 30 for a terminal 32 to be placed at one of the local convergence points 18 in FIG. 1. The terminal 32 may be in the form of a cabinet or enclosure that includes the frame 30 installed in a housing (not shown). The frame 30 supports various components for accomplishing the network tasks associated with the local convergence point 18. For example, a row of fiber optic adapters 34 supported by the frame 30 defines a "feeder field" 36 to receive connections associated with one of the feeder cables 16 of the network 10. Optical fibers (not shown) from the feeder cable 16 may be terminated with fiber optic connectors (directly or by splicing to pigtails) that are plugged into the fiber optic adapters 34 on the back side of the frame 30.

Below the feeder field 36, the frame 30 defines one or more slots 40 for receiving and supporting splitter modules 42. Only two splitter modules 42 are shown in FIG. 2, and only the splitter module 42 on the bottom is schematically illustrated with an input cable 44 and a plurality of output cables 48 to simplify the drawings. The input cable 44 carries an input fiber (not shown), and the output cables 48 carry respective output fibers (not shown). The splitter modules 42 each include an optical splitter (not shown) so that a multiplexed signal carried by the input fiber of the input cable 44 can be separated into demultiplexed signals carried by the output fibers of the output cables 48. The multiplexed signal typically comes from the feeder cable 16 (FIG. 1). To this end, the input cable 44 of the splitter module 42 may be terminated with a fiber optic connector (not shown in FIG. 2) and plugged into the front side of the fiber optic adapters 34 in the feeder field 36, thereby establishing optical connections with optical fibers of the feeder cable 16.

The number of output fibers (and corresponding output cables 48) of each splitter module 42 depends on the split ratio (e.g., 1 input fiber and 8 output fibers for a 1×8 splitter, 1 input fiber and 16 output fibers fora 1×16 splitter, 1 input fiber and 32 output fibers for a 1×32 splitter, etc.). Output cables 48 that are "live" (i.e., used in the network to carry signals to and from subscribers) are plugged into the front side of fiber optic adapters 34 in a distribution field 52. There are typically several or many rows of adapters 34 defining the distribution field 52. These adapters 34 are used to establish optical connections with optical fibers of one or more distribution cables 20 that exit the terminal and carry signals further into the network 10 so that ultimately the signals can reach subscribers.

Conventionally, the output cables 48 that are not used for live network traffic, and instead are reserved for future subscribers, are routed to a storage location 54 (also referred to as a parking field 54). FIG. 2 illustrates four output cables 48 terminated with respective fiber optic connectors 50 ("connectors 50") that are held within a parking device 60. The parking device 60 is mounted to a door panel 62 of the frame 30 via a mounting structure 64.

As can be appreciated, populating the slots 40 with splitter modules 42 having various footprints (e.g., peripheral shapes and sizes) and other differing mounting considerations (e.g., mounting hardware) can lead to undesirable crowding and an inefficient use of the relatively small space provided by the slots 40. In one embodiment of the invention, the splitter modules 42 are configured with one or more interlocking features for stacking multiple splitter modules 42 together and/or for installing the splitter modules 42 in the terminal 32 in a highly space-efficient manner, thereby allowing for higher densities of splitter modules 42 in the terminal 32.

Figure 3A:
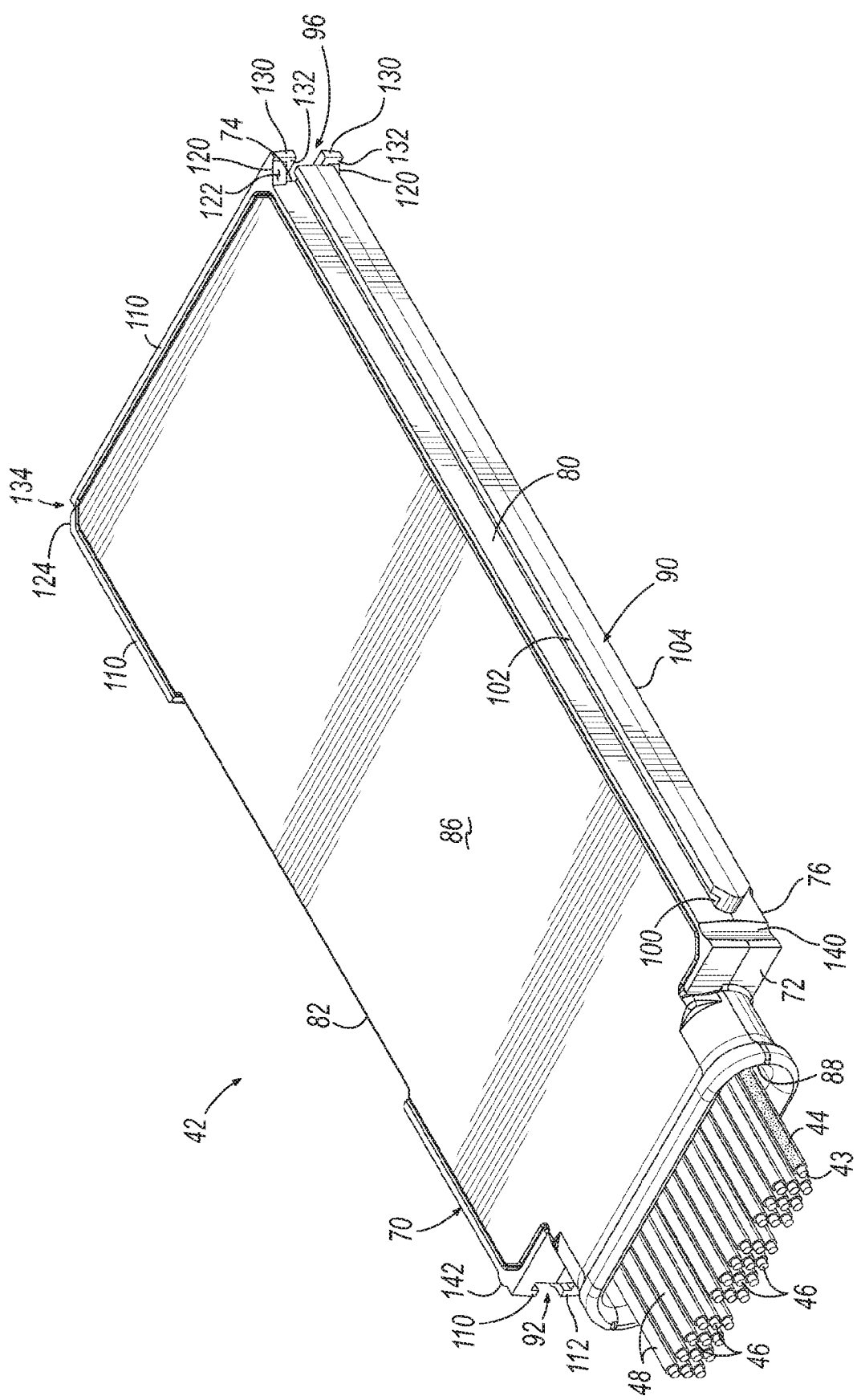
FIG. 3A is a front perspective view of an exemplary splitter module in accordance with one embodiment of this disclosure.
Figure 4:
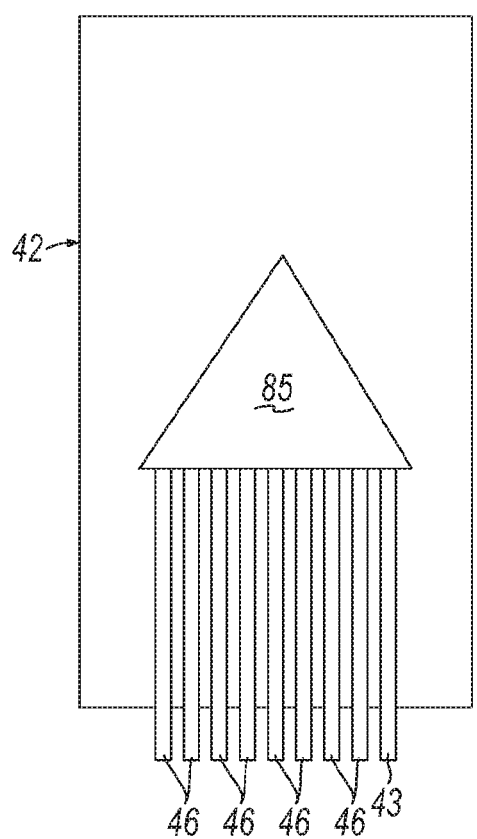
FIG. 4 is a schematic illustration of the splitter module including an optical splitter.

Referring now to FIGS. 3A and 3B, the illustrated splitter module 42 includes a body 70 having a front wall 72, a rear wall 74, a bottom wall 76, and first and second side walls 80, 82 together at least partially defining an interior space 84 (FIG. 7) for housing fiber optic components such as an optical splitter 85 shown schematically in FIG. 4. In this disclosure, references to longitudinal or longitudinally refer to lengthwise directions of the part(s) being described. For example, references to longitudinal or longitudinally pertaining to the splitter module 42 itself refer to directions extending between the front wall 72 and rear wall 74. Additionally, moving from the front wall 72 toward the rear wall 74 is considered a rearward direction, and moving from the rear wall 74 toward the front wall 72 is considered a forward direction. References to lateral or laterally refer to widthwise directions of the part(s) being described. For example, references to lateral or laterally pertaining to the splitter module 42 itself refer to directions extending between the first and second side walls 80, 82.

Still referring to FIGS. 3A and 3B, the splitter module 42 also includes a top cover 86 for closing off the interior space 84 and a port 88 positioned on the front wall 72 for allowing an input fiber 43 and plurality of output fibers 46 to extend through the front wall 72 into the interior space 84 for optical coupling with the optical splitter 85 (FIG. 4). It will be appreciated that the port 88 may be configured in any suitable manner for allowing the input fiber 43 and output fibers 46 to pass into the interior space 84 through the front wall 72 or the rear wall 74. In one embodiment, multiple ports (not shown) may accommodate various subsets of input and output fibers 43, 46. For example, a second port may be positioned on the rear wall 74.

As shown, the first side wall 80 includes a tongue 90 extending longitudinally along (i.e., in the lengthwise direction of) the first side wall 80, the second side wall 82 includes first and second grooves 92, 94 extending longitudinally along (i.e., in the lengthwise direction of) the second side wall 82, and the rear wall 74 includes a third groove 96 extending longitudinally along (i.e., in the lengthwise direction of) the rear wall 74. In the embodiment shown, the tongue 90 extends substantially along the entire length of the first side wall 80, and the third groove 96 extends substantially along the entire length of the rear wall 74. Alternatively, the tongue 90 and third groove 96 may extend along one or more portions of the lengths of the respective side and rear walls 80, 74. For example, the tongue 90 and/or third groove 96 may be bifurcated into a first portion proximate a first end of the respective wall 80, 74 and a second portion proximate a second end of the respective wall 80, 74. Similarly, while the first and second grooves 92, 94 are shown extending along respective portions of the length of the second side wall 82 proximate first and second ends of the second side wall 82, the second side wall 82 may instead include a single continuous groove extending substantially along the entire length thereof, or may be configured in any other suitable manner.

The first, second, and third grooves 92, 94, 96 are each complementary to the tongue 90. This means the first, second, and third grooves 92, 94, 96 are each shaped to receive a structure like the tongue 90. For example, the first, second, and third grooves 92, 94, 96 may each have a cross sectional shape generally matching a cross sectional shape of the tongue 90. As will be described in greater detail below, if a second splitter module is provided with the same configuration as the splitter module 42, the tongue 90 of the second splitter module may be received in any of the first, second, or third grooves 92, 94, 96 of the splitter module 42. In essence, the tongue 90 represents a first interlocking feature and the first, second, and third grooves 92, 94, 96 represent a second interlocking feature that is designed to cooperate with the first interlocking feature.

In the embodiment shown, the tongue 90 includes an elongate central portion 100 and first and second elongate flange portions 102, 104 such that the tongue 90 has a generally T-shaped cross section. Each of the grooves 92, 94, 96 is defined by first and second inwardly facing L-shaped support portions 110, 112 such that each groove 92, 94, 96 has a generally T-shaped cross section similar in size to that of the tongue 90. Thus, the tongue 90 may be capable of interlocking with any of the grooves 92, 94, 96 (e.g., of a second splitter module 42) in a manner that allows longitudinal movement of the tongue 90 relative to the grooves 92, 94, 96 (i.e., in the respective lengthwise directions) while restricting lateral movement of the tongue 90 relative to the grooves 92, 94, 96 (i.e., in the respective widthwise directions). Interlocking that allows relative longitudinal movement can be referred to as sliding engagement, and interlocking that restricts lateral movement (i.e., prevents separation in a lateral direction) can be referred to as mating engagement. Other configurations may be used for the tongue 90 and groove(s) 92, 94, 96 to provide for sliding engagement and mating engagement. For example, the tongue 90 may have a generally dovetail-shaped cross section, and the first, second, and/or third grooves 92, 94, 96 may each have a similarly sized and configured cross section (i.e., also generally dovetail-shaped). In the embodiment shown, the tongue 90 and grooves 92, 94, 96 are each integrally formed together with the body 70 of the splitter module 42 as a unitary (i.e., monolithic) piece. Alternatively, a conventional splitter module may be retrofitted with the tongue 90 and/or grooves 92, 94, 96, such as by attaching the tongue 90 and/or support portions 110, 112 to the respective walls 80, 82, 74.

The illustrated first side wall 80 includes a pair of stops 120 at or near the rear wall 74, each including a first abutment surface 122. The second side wall 82 includes a pair of truncations, such as bevels 124, at or near the rear wall 74, each including a second abutment surface 126. In the embodiment shown, the first and second abutment surfaces 122, 126 are oriented relative to the respective side walls 80, 82 at substantially the same angle such that the first and second abutment surfaces 122, 126 are generally parallel to each other, and are spaced apart from the front wall 72 by respective first and second distances that are substantially the same. As used in this disclosure, distances being "substantially the same" refers to them being within 10% of each other. Regardless, the first abutment surface 122 may be capable of cooperating with the second abutment surface 126 of a second splitter module 42 (not shown in FIGS. 3A and 3B) to limit longitudinal movement of the first and second splitter modules 42 relative to each other. In particular, the first abutment surface 122 on the first splitter module 42 may limit longitudinal movement of the associated first side wall 80 and accompanying tongue 90 relative to the second side wall 82 and accompanying grooves 92, 94 of the second splitter module 42 to a predetermined distance.

The illustrated rear wall 74 includes a pair of extensions 130 of the L-shaped support portions 110, 112 at one end of the rear wall 74. As shown in FIG. 3A, the extensions 130 define the third groove 96 at or near the stops 120 of the first side wall 80, and each include a third abutment surface 132. At an opposite end of the rear wall 74, and as shown in FIG. 3B, the L-shaped support portions 110, 112 are spaced apart from the bevels 124 to define a pair of recesses 134. Each recess 134 includes fourth and fifth abutment surfaces 136, 138. In the embodiment shown in FIGS. 3A and 3B, the third and fourth abutment surfaces 132, 136 are oriented parallel to the rear wall 74 and to each other, and are spaced apart from the front wall 72 by respective third and fourth distances that are substantially the same. Thus, the third abutment surfaces 132 may be capable of cooperating with the fourth abutment surfaces 136 of a second splitter module 42 (not shown) to limit longitudinal movement of the first and second splitter modules 42 relative to each other. In particular, the third abutment surfaces 132 on the first splitter module 42 may limit longitudinal movement of the associated first side wall 80 and accompanying tongue 90 relative to the second side wall 82 and accompanying grooves 92, 94 of the second splitter module 42 to a predetermined distance.

In the embodiment shown, the first side wall 80 includes an indent 140 and the second side wall 82 includes a pair of detents 142 complementary to the indent 140 and spaced apart from the front wall 72 by substantially the same distance as the indent 140. The illustrated detents 142 are positioned on the first and second L-shaped support portions 110, 112 defining the first groove 92. As shown, the indent 140 has a generally curved profile and the detents 142 each have a generally matching curved profile. Thus, the detents 142 may be capable of cooperating with the indent 140 (e.g., of a second splitter module 42) to selectively lock a longitudinal positioning of the first splitter module 42 relative to a second splitter module 42 (not shown).

Figure 5:
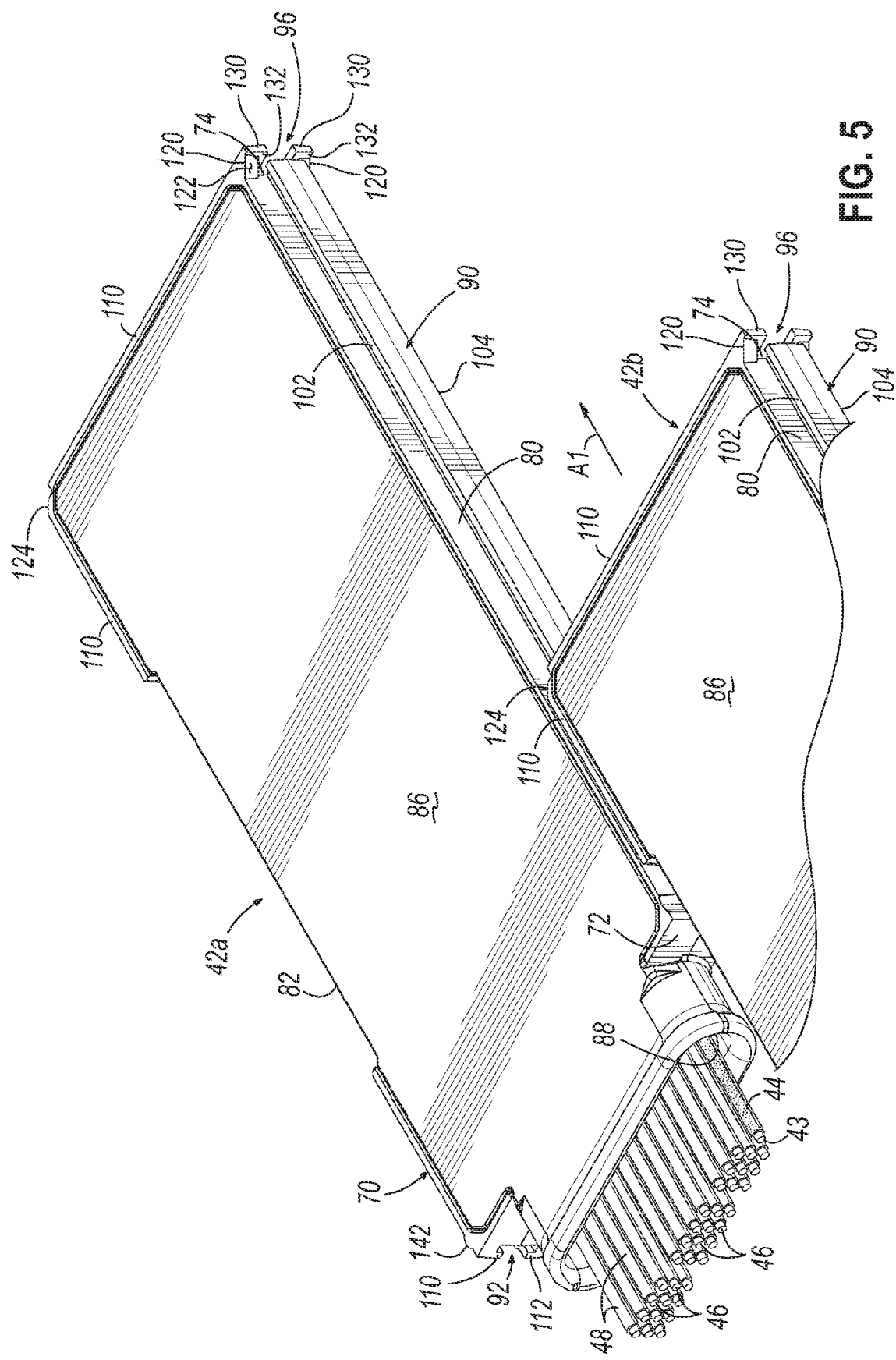
FIG. 5 is a partial perspective view of a pair of splitter modules in alignment with and moving relatively toward each other for interlocking.
Figure 6:
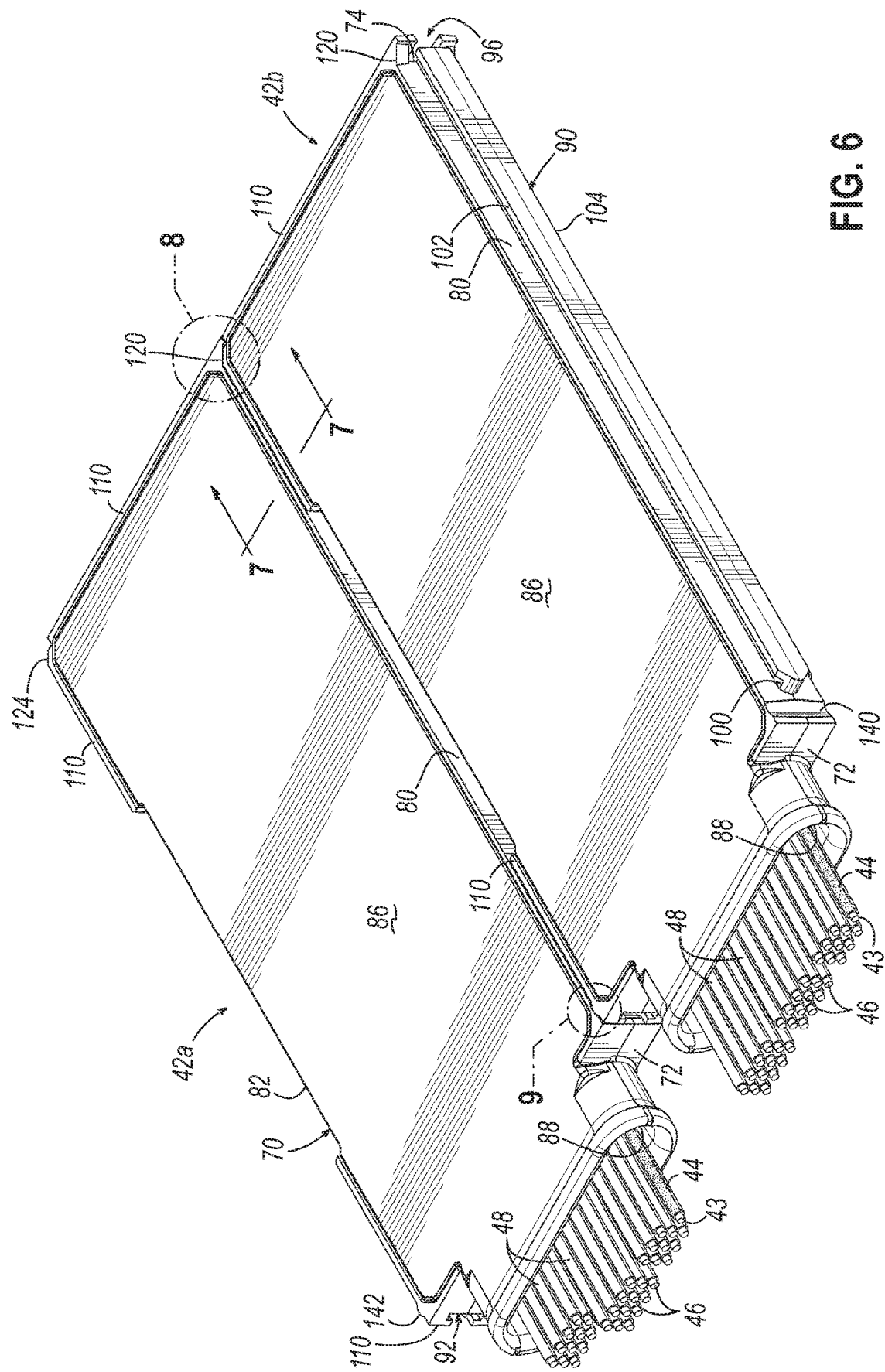
FIG. 6 is a perspective view showing the pair of splitter modules of FIG. 5 interlocked with each other.

Referring now to FIGS. 5 and 6, wherein like reference numerals indicate like features, first and second splitter modules 42a, 42b of substantially similar configuration may be interlocked with each other, such as for stacking and/or installation purposes. In this regard, the first and second splitter modules 42a, 42b may be interlocked with each other by aligning the tongue 90 of the first splitter module 42a with at least one groove, such as the first and second grooves 92, 94, of the second splitter module 42b, and sliding the groove(s) 92, 94 along the tongue 90 in the direction indicated by the arrow A1 (FIG. 5) until the bodies 70 of the first and second splitter modules 42a, 42b are substantially adjacent to each other, such as along the lengths thereof (FIG. 6).

As best shown in FIG. 7, the tongue 90 of the first splitter module 42a may matingly and slidingly engage with the groove(s) 92, 94, 96 of the second splitter module 42b, such as with the first and second grooves 92, 94, and thereby selectively interlock the first and second splitter modules 42a, 42b to restrict relative movement of the first and second splitter modules 42a, 42b in the lateral direction. More particularly, the central portion 100 and flange portions 102, 104 of the generally T-shaped tongue 90 of the first splitter module 42a are received by the L-shaped support portions 110, 112 that define the generally T-shaped groove(s) 92, 94, 96 of the second splitter module 42b. The geometries/configurations permit relative longitudinal movement of the first and second splitter modules 42a, 42b to provide a sliding engagement, but restrict lateral movement of the first and second splitter modules 42a, 42b away from each other to provide a mating engagement. While the tongue 90 of the first splitter module 42a is matingly and slidingly engaged with the grooves 92, 94 of the second splitter module 42b in the position illustrated in FIGS. 6 and 7, it will be appreciated that the tongue 90 of the second splitter module 42b may matingly and slidingly engage with the groove(s) 92, 94, 96 of the first splitter module 42a to selectively interlock the first and second splitter modules 42a, 42b in a similar manner in a different position.

As best shown in FIG. 8, the first abutment surfaces 122 of the first splitter module 42a confront and abut the second abutment surfaces 126 of the second splitter module 42b to limit movement of the tongue 90 of the first splitter module 42a along the first and second grooves 92, 94 of the second splitter module 42b to the position shown in FIG. 6. More particularly, the interaction between the first abutment surfaces 122 and the second abutment surfaces 126 limits movement of the second splitter module 42b in a rearward direction (e.g., in the direction of the arrow A1 shown in FIG. 5). The third abutment surfaces 132 of the first splitter module 42a similarly confront the fourth abutment surfaces 136 of the second splitter module 42b. While not shown, the third abutment surfaces 132 may also abut the fourth abutment surfaces 136 to assist in limiting movement of the tongue 90 along the grooves 92, 94.

As best shown in FIG. 9, the detent 142 of the second splitter module 42b is received by the indent 140 of the first splitter module 42a to selectively lock the relative positioning of the first and second splitter modules 42a, 42b in the longitudinal direction. For example, the detent 142 may provide a snap-fit with the indent 140. In one embodiment, the interaction between the detent 142 and the indent 140 may require a threshold force to be applied on the first or second splitter modules 42a, 42b to move the first and second splitter modules 42a, 42b longitudinally relative to each other. In this manner, the interaction between the detent 142 and the indent 140 may prevent inadvertent longitudinal movement of the second splitter module 42b relative to the first splitter module 42a, such as in a forward direction (e.g., in a direction opposite that of the arrow A1 shown in FIG. 5).

In the embodiment shown, the detent 142 of the second splitter module 42b is received by the indent 140 of the first splitter module 42a when the first abutment surfaces 122 of the first splitter module 42a abut the second abutment surfaces 126 of the second splitter module 42b. Thus, the interaction between the tongue 90 and the grooves 92, 94, the interaction between the first and second abutment surfaces 122, 126, and the interaction between the detent 142 and the indent 140 may together selectively secure the relative positioning of the first and second splitter modules 42a, 42b in the longitudinal and lateral directions. The interlocked first and second splitter modules 42a, 42b may be mounted together in the frame 30, as described in greater detail below.

Referring now to FIGS. 10 and 11, a plurality of splitter modules 42a, 42b, 42c, 42d may be interlocked with each other in a manner similar to that described above and mounted to a tray 150, such as for installation purposes. The illustrated tray 150 includes a platform 152 extending between a front end 154 and a rear end 156. In the embodiment shown, the platform 152 is configured to directly support the splitter modules 42a, 42b, 42c, 42d, such as when oriented horizontally. The tray 150 also includes a rear wall 158 extending along the rear end 156 of the platform 152 and first and second side walls 160, 162 extending from the rear wall 158 along the platform 152 toward the front end 154. As best shown in FIG. 11, a bracket 170 extends longitudinally along at least a portion of the first side wall 160. The bracket 170 is configured to matingly and slidingly engage with one or more of the groove(s) 92, 94, 96 of at least one of the splitter modules 42a, 42b, 42c, 42d, such as the first and second grooves 92, 94, to selectively interlock the splitter module 42a, 42b, 42c, 42d with the tray 150. In this regard, the bracket 170 includes an elongate central portion 172 and an elongate flange portion 174 such that the bracket 170 has a generally L-shaped cross section complementary to at least a portion of the T-shaped cross section of the groove(s) 92, 94, 96. In another embodiment, the bracket 170 may be replaced with a tongue generally similar to the tongue 90 of the splitter module 42a, 42b, 42c, 42d itself. In the embodiment shown, the first splitter module 42a is interlocked with the tray 150. As best shown in FIG. 10, the rear wall 158 of the tray 150 may be capable of cooperating with the splitter modules 42a, 42b, 42c, 42d (e.g., with each rear wall 74 thereof) to limit longitudinal movement of the splitter modules 42a, 42b, 42c, 42d along the platform 152 of the tray 150.

In the embodiment shown, the tray 150 includes a plurality of tabs 180 extending from the rear wall 158 toward the front end 154 and spaced apart from the platform 152 so that the tray 150 receives the splitter modules 42a, 42b, 42c, 42d between the platform 152 and the tabs 180. For example, the tabs 180 may each be spaced apart from the platform 152 to define a space for receiving a portion of the respective splitter module(s) 42a, 42b, 42c, 42d. In one embodiment, the tabs 180 may be configured to form a friction fit with the respective splitter module(s) 42a, 42b, 42c, 42d in order to assist in retaining the splitter modules 42a, 42b, 42c, 42d on the platform 152.

The tray 150 may be mounted to the frame 30 (FIG. 2) of the terminal 32 in any suitable manner. In this regard, the illustrated tray 150 includes first and second longitudinal runners 190, 192 extending partially along and rearwardly beyond the sides of the platform 152. The runners 190, 192 may be configured to slide along corresponding sliders (not shown) installed on the frame 30 such that the tray 150 may be slidable relative to the frame 30. Such a configuration may assist in providing access to the splitter modules 42a, 42b, 42c, 42d, for example. Other suitable configurations may be used. For example, the tray 150 may be fixed relative to the frame 30. The tray 150 may also be oriented on the frame 30 horizontally, vertically, or in any other suitable orientation.

Figure 12:
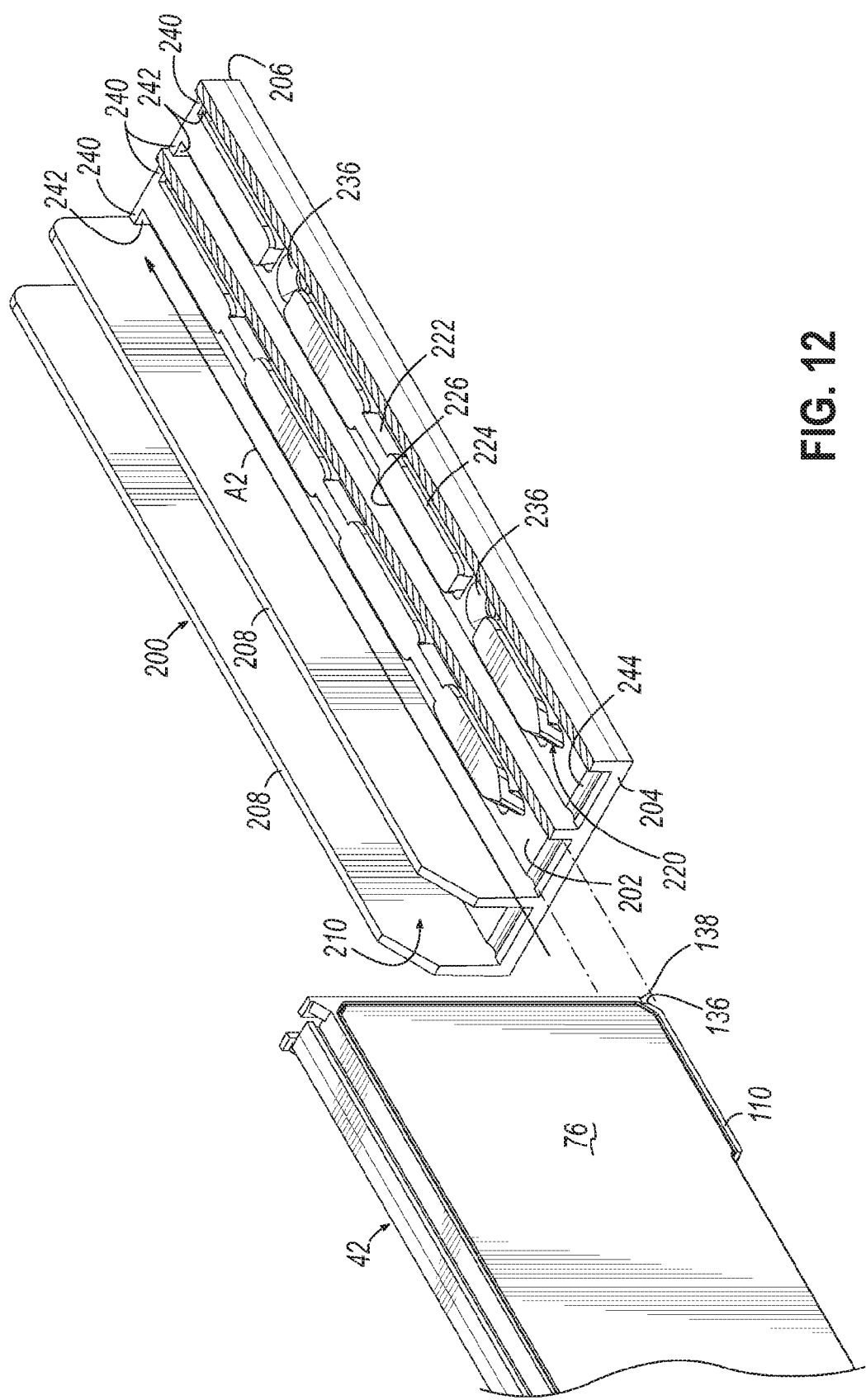
FIG. 12 is a partial perspective view of a rail and a splitter module in alignment with and moving relatively toward each other for interlocking in a first arrangement.
Figure 13:
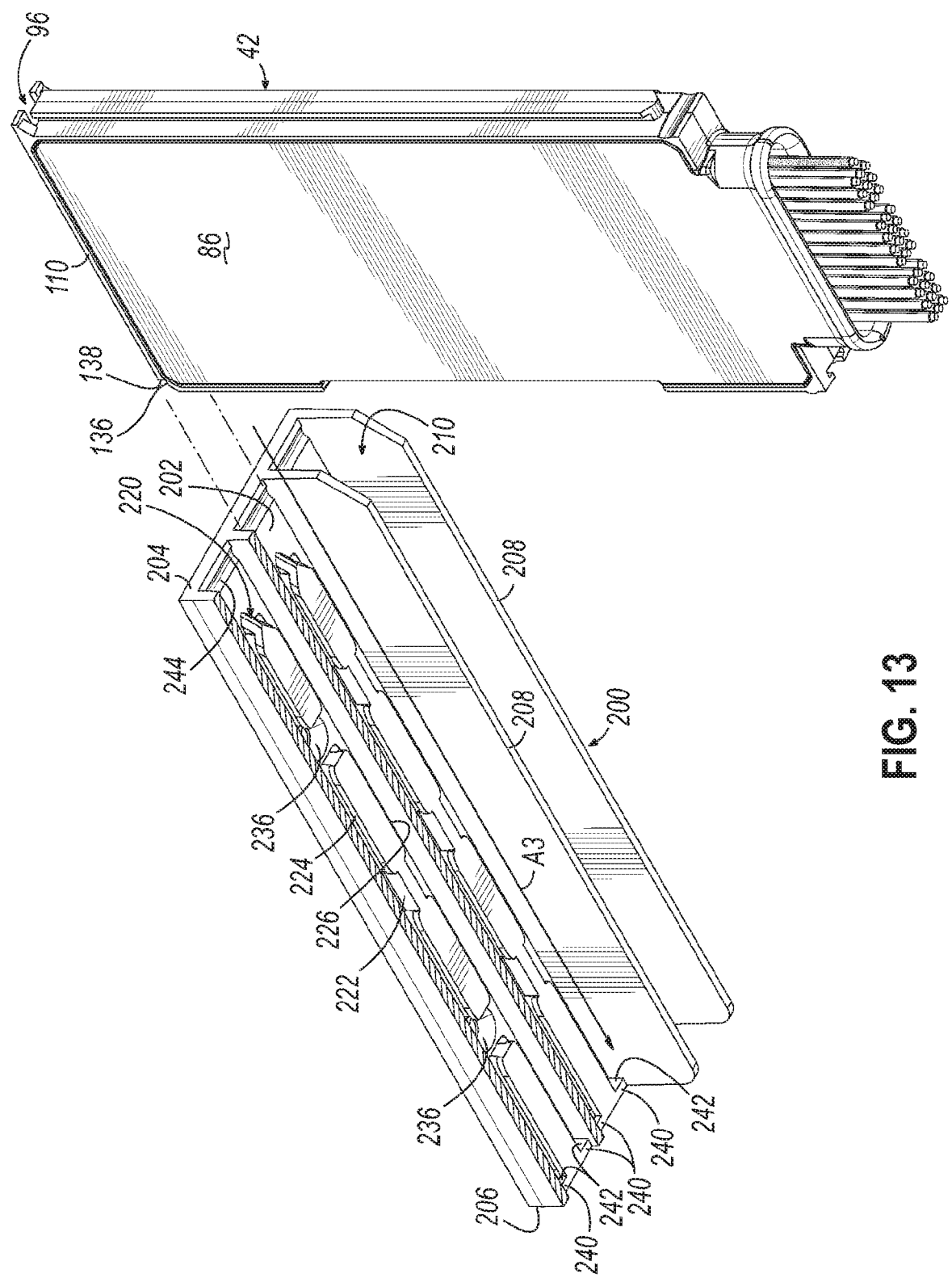
FIG. 13 is a perspective view of a rail and a splitter module in alignment with and moving relatively toward each other for interlocking in a second arrangement.

Referring now to FIGS. 12 and 13, the exemplary splitter module 42 may be interlocked with a rail 200, such as for installation purposes. The illustrated rail 200 includes a platform 202 extending between a front end 204 and a rear end 206, and a plurality of partitions 208 extending longitudinally along the platform 202 and generally equally spaced apart from each other to define a channel 210 between each pair of adjacent partitions 208. A plurality of tongues 220 extend longitudinally along the platform 202, each tongue 220 corresponding to one of the channels 210. Each tongue 220 is configured to matingly and slidingly engage with one or more of the groove(s) 92, 94, 96 of the splitter module 42, such as the first and second grooves 92, 94 (FIG. 12) or the third groove 96 (FIG. 13), to selectively interlock the splitter module 42 with the rail 200. In this regard, each tongue 220 may be generally similar to the tongue 90 of the splitter module 42 itself. For example, each tongue 220 may include an elongate central portion 222 and first and second elongate flange portions 224, 246 such that the tongue 220 has a generally T-shaped cross section complementary to that of the groove(s) 92, 94, 96. Each of the flange portions 224, 226 of the illustrated tongue 220 are segmented. Alternatively, the flange portions 224, 226 may each be substantially continuous, similar to those of the tongue 90 of the splitter module 42. The rail 200 may also include one or more pairs of mounting prongs 230, 232 (FIG. 16) extending outwardly from the platform 202 opposite the tongues 220 to facilitate mounting of the rail 200 on the frame 30. In addition or alternatively, the rail 200 may include one or more bores and/or countersinks 236 in the platform 202 for receiving one or more fasteners to facilitate mounting of the rail 200 on the frame 30.

In the embodiment shown, the rail 200 includes a plurality of stops 240 at or near the rear end 206 of the platform 202, each stop 240 including a sixth abutment surface 242 oriented generally perpendicular to the longitudinal direction of the tongues 220. The sixth abutment surfaces 242 are configured to cooperate with the fourth and/or fifth abutment surfaces 136, 138 of the splitter module 42 to limit movement of the splitter module 42 along the rail 200 to a predetermined distance. In one embodiment, the sixth abutment surfaces 242 may be spaced apart from the front end 204 of the platform 202 at a substantially same distance as the fourth abutment surfaces 136 are spaced apart from the front wall 72 of the splitter module 42.

The illustrated rail 200 also includes a plurality of indents 244 each complementary to the detent(s) 142 of the splitter module 42 and spaced apart from the front end 204 by a substantially same distance as the detent(s) 142 are spaced apart from the front wall 72 of the splitter module 42. Thus, the detents 142 may be capable of cooperating with any of the indents 244 to selectively lock the relative positioning of the splitter module 42 and the rail 200 in the longitudinal direction. For example, the detents 142 may provide a snap-fit with any of the indents 244. In one embodiment, the interaction between the detent 142 and a given one of the indents 244 may require a threshold force to be applied on the splitter module 42 or rail 200 to move the splitter module 42 and rail 200 longitudinally relative to each other. The indent 244 may receive the detent 142 when the sixth abutment surfaces 242 abut the fourth abutment surfaces 136, for example.

As shown in FIG. 12, the splitter module 42 may be interlocked with the rail 200 by aligning one of the tongues 220 of the rail 200 with the first and second grooves 92, 94 along the second side wall 82 of the splitter module 42, and sliding the groove(s) 92, 94 along the tongue 220 in the direction indicated by the arrow A2 until the sixth abutment surfaces 242 of the rail 200 engage with the fourth abutment surfaces 136 of the splitter module 42, for example. Alternatively, as shown in FIG. 13, the splitter module 42 may be interlocked with the rail 200 by aligning one of the tongues 220 of the rail 200 with the third groove 96 along the rear wall 74 of the splitter module 42, and sliding the groove 96 along the tongue 220 in the direction indicated by the arrow A3 until the sixth abutment surfaces 242 of the rail 200 engage with the fifth abutment surfaces 138 of the splitter module 42, for example.

Figure 14:
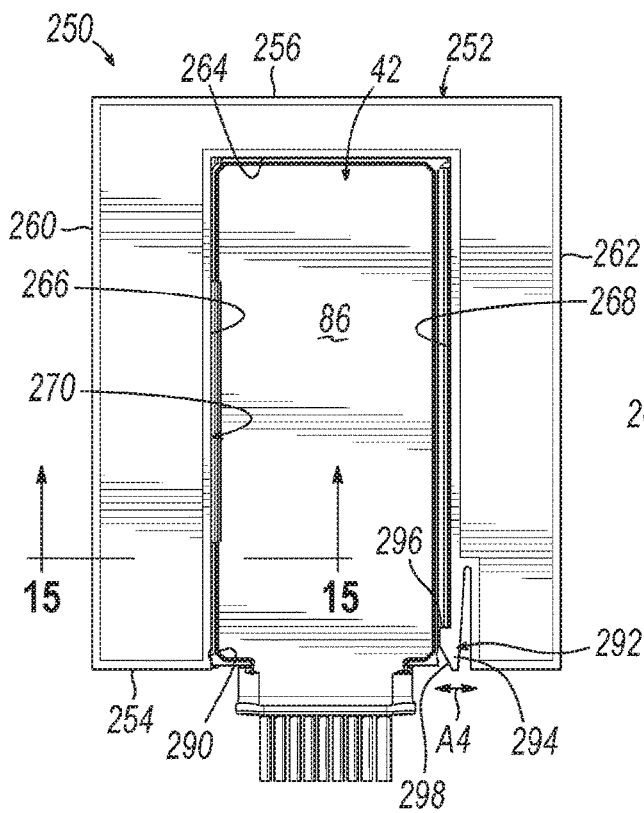
FIG. 14 is a top plan view of a splitter module interlocked with an adapter cradle.
Figure 15:
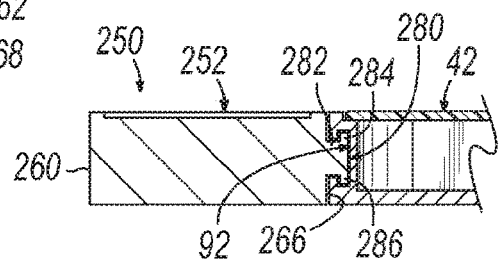
FIG. 15 is a cross sectional view of the splitter module and adapter cradle taken along section line 15-15 in FIG. 14.

Referring now to FIGS. 14 and 15, the exemplary splitter module 42 may be interlocked with an adapter cradle 250, such as for installation purposes. The illustrated adapter cradle 250 includes a generally U-shaped cradle body 252 having a bifurcated outer front surface 254, an outer rear surface 256, and first and second outer side surfaces 260, 262. The cradle body 252 also has an inner rear surface 264 and first and second inner side surfaces 266, 268 together defining a cavity 270 for receiving the body 70 of the splitter module 42. As best shown in FIG. 15, the cradle body 252 includes a tongue 280 extending longitudinally along at least a portion of the first inner side surface 266 configured to matingly and slidingly engage with one or more of the groove(s) 92, 94, 96 of the splitter module 42, such as the first and second grooves 92, 94, to selectively interlock the splitter module 42 with the cradle body 252. In this regard, the tongue 280 may be generally similar to the tongue 90 of the splitter module 42 itself. For example, the tongue 280 may include an elongate central portion 282 and first and second elongate flange portions 284, 286 such that the tongue 280 has a generally T-shaped cross section complementary to that of the groove(s) 92, 94, 96. As best shown in FIG. 14, the inner rear surface 264 of the cradle body 252 may be capable of cooperating with the splitter module 42 (e.g., with the rear wall 74) to limit longitudinal movement of the splitter module 42 within the cavity 270 of the cradle body 252.

In the embodiment shown, the adapter cradle 250 includes an indent 290 complementary to the detents 142 of the splitter module 42 positioned on the first inner side surface 266 and spaced apart from the outer front surface 254 by a substantially same distance as the detents 142 are spaced apart from the front wall 72 of the splitter module 42. Thus, the indent 290 may be capable of cooperating with the detent(s) 142 to selectively lock the relative positioning of the splitter module 42 and the adapter cradle 250 in the longitudinal direction. For example, the indent 290 may provide a snap-fit with the detent 142. In one embodiment, the interaction between the indent 290 and the detent 142 may require a threshold force to be applied on the splitter module 42 or adapter cradle 250 to move the splitter module 42 and adapter cradle 250 longitudinally relative to each other.

The illustrated adapter cradle 250 also includes a spring clip 292 including a tab 294 having a shoulder 296 facing the cavity 270. As shown, the shoulder 296 is configured to engage with the splitter module 42 (e.g., with an end of the tongue 90 of the splitter module 42) such that interaction between the shoulder 296 and the splitter module 42 selectively locks a relative positioning of the adapter cradle 250 and the splitter module 42. In this regard, the tab 294 includes a cam surface 298 configured to engage with the splitter module 42 during insertion of the body 70 of the splitter module 42 into the cavity 270 such that interaction between the cam surface 298 and the splitter module 42 urges the tab 294 away from the splitter module 42 until the splitter module 42 clears the tab 294, thereby allowing the tab 294 to spring back into position such that the shoulder 296 may engage with the splitter module 42, as indicated by the double arrow A4.

Figure 16:
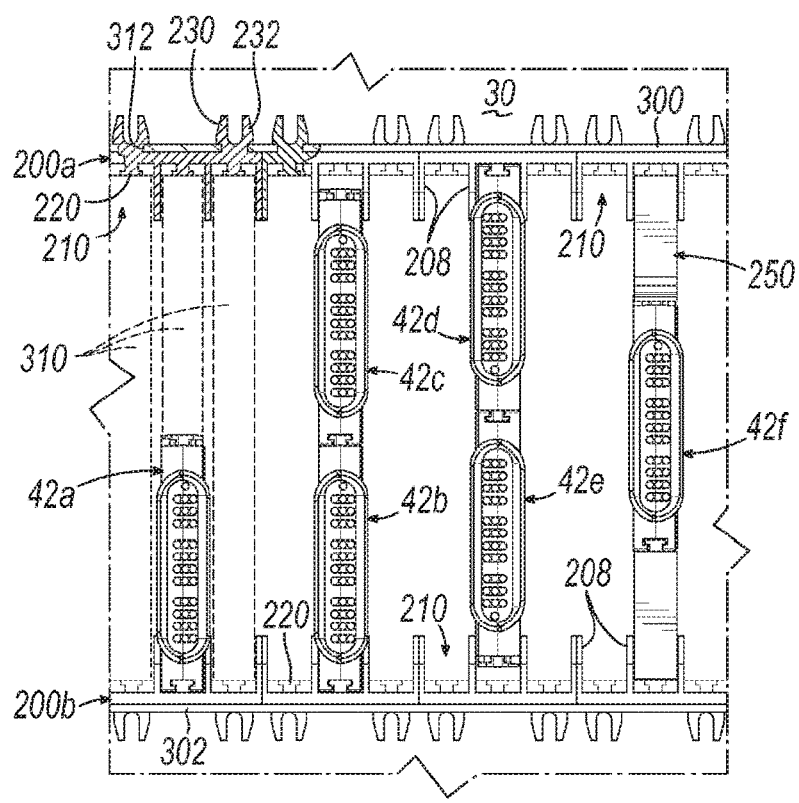
FIG. 16 is a front plan view of a plurality of splitter modules mounted to a frame of a terminal in a variety of arrangements.

Referring now to FIG. 16, a plurality of splitter modules 42a, 42b, 42c, 42d, 42e, 42f are shown installed in the frame 30, such as within the one or more slots 40, via multiple rails 200. More particularly, a first row of top rails 200a is mounted to a top frame wall 300 and a second row of bottom rails 200b is mounted to a bottom frame wall 302 in alignment with the first row of top rails 200b to define a plurality of generally uniform slips 310. Each rail 200a, 200b is mounted to the respective frame wall 300, 302 via respective pairs of mounting prongs 230, 232 received by corresponding apertures 312 extending through the respective frame wall 300, 302.

As shown, the splitter modules 42a, 42b, 42c, 42d, 42e, 42f may be installed in a variety of arrangements. For example, the first splitter module 42a is directly interlocked with and extends freely upwardly from a bottom rail 200b. The second splitter module 42b is directly interlocked with and extends upwardly from another bottom rail 200b, and is further interlocked with the third splitter module 42c extending further upwardly therefrom and received within a channel 210 of a corresponding top rail 200a such that the partitions 208 of the top rail 200a may assist in stabilizing the interlocked second and third splitter modules 42b, 42c. The fourth splitter module 42d is directly interlocked with and extends downwardly from another top rail 200a, and is further interlocked with a fifth splitter module 42e extending further downwardly therefrom and received within a channel 210 of a corresponding bottom rail 200b such that the partitions 208 of the bottom rail 200b may assist in stabilizing the interlocked fourth and fifth splitter modules 42d, 42e. A sixth splitter module 42f is held by the adapter cradle 250 which is slidingly received by the aligned channels 210 of a bottom rail 200b and corresponding top rail 200a.

Thus, the exemplary splitter module 42 may be installed in the frame 30 in a versatile, organized, and/or space-efficient manner. For example, each splitter module 42 may be mounted to another splitter module 42, to sides of the frame 30 (e.g., in a cantilevered fashion), to top walls of the frame 30 (e.g., in a hanging fashion), to trays 150, and/or to adapter cradles 250, via one or more surfaces of each splitter module 42. In addition or alternatively, each splitter module 42 may each be installed in a generally similar or same manner (e.g., via a rail 200) such that dedicated or unique mounting hardware for each individual splitter module 42 may be avoided. In cases where the rails 200 are employed, for example, the uniformity of the channels 210 and/or slips 310 may also allow for organization of the splitter modules 42 in a generally predetermined manner, such that a technician may readily and easily install the splitter modules 42 in a desired arrangement. Moreover, the splitter modules 42 may be interlocked with each other and/or with the adapter cradle 250 to occupy a generally uniform footprint which can be accommodated by any of the channels 210 and/or slips 310. Thus, even splitter modules 42 of varying sizes may conform to the generally uniform footprint.

While the splitter modules shown and described herein are of uniform dimensions, the splitter modules may be of any various dimensions. For example, differently sized splitter modules may have similarly sized interlocking features (e.g., tongues and grooves) configured to engage with each other for interlocking the differently sized splitter modules to each other. In addition or alternatively, adapter cradles of various sizes and configurations may be used to effectively resize the footprint of a smaller splitter module to match that of a larger splitter module.

While the interlocking features shown and described herein have been in the form of tongues and grooves, it will be appreciated that any other suitable mating and/or interlocking features may be used. Moreover, while the exemplary tongues have been shown and described on certain structures and the counterpart grooves have been shown and described on other structures, it will be appreciated that these arrangements may be inverted. For example, a tongue may be substituted with a groove and the counterpart groove(s) may be substituted with a tongue. Likewise, the arrangements of exemplary indents and counterpart detents and/or of abutment surfaces may be inverted or otherwise modified in any suitable manner to achieve the various benefits described herein.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The disclosure in its broader aspects is therefore not limited to the specific details, representative apparatus and methods and illustrative examples shown and described. Accordingly, departures may be made from such details without departing from the scope of the disclosure.

What is claimed is:

1. A fiber optic splitter module comprising:
   a body including a front wall, a rear wall, and first and second side walls together at least partially defining an interior space, wherein the first side wall includes a tongue extending longitudinally along the first side wall, and wherein the second side wall includes a first groove that is complementary to the tongue;
   an optical splitter positioned in the interior space;
   an input fiber extending through the front wall or the rear wall into the interior space and optically coupled to the optical splitter; and
   a plurality of output fibers extending through the front wall or the rear wall into the interior space and optically coupled to the optical splitter.

2. The fiber optic splitter module of claim 1, further comprising:
   a port positioned on the front wall or the rear wall, wherein the input fiber or the plurality of output fibers extends through the port and into the interior space.

3. The fiber optic splitter module of claim 1, wherein the rear wall includes a second groove that is complementary to the tongue.

4. The fiber optic splitter module of claim 1, wherein one of the first or second side walls comprises a stop that includes a first surface positioned at a first distance from the front wall, the other of the first or second side walls comprises a truncation that includes a second surface positioned at a second distance from the front wall, and the first and second distances are substantially the same.

5. The fiber optic splitter module of claim 1, wherein one of the first or second side walls comprises a detent spaced a first distance from the front wall, the other of the first or second side walls comprises an indent that is complementary to the detent and that is spaced a second distance from the front wall, and the first and second distances are substantially the same.

6. A pair of interlocking fiber optic splitter modules comprising:
   a first fiber optic splitter module comprising:
      a first body including a first front wall, a first rear wall, and first and second side walls together at least partially defining a first interior space, wherein the first side wall includes a first tongue and the second side wall includes a first groove;
      a first optical splitter positioned in the first interior space;
      a first input fiber extending through the first front wall or the first rear wall into the first interior space and optically coupled to the first optical splitter; and
      a plurality of first output fibers extending through the first front wall or the first rear wall into the first interior space and optically coupled to the first optical splitter; and
   a second fiber optic splitter module comprising:
      a second body including a second front wall, a second rear wall, and third and fourth side walls together at least partially defining a second interior space, wherein the third side wall includes a second tongue and the fourth side wall includes a second groove;
      a second optical splitter positioned in the second interior space;
      a second input fiber extending through the second front wall or the second rear wall into the second interior space and optically coupled to the second optical splitter; and
      a plurality of second output fibers extending through the second front wall or the second rear wall into the second interior space and optically coupled to the second optical splitter,
   wherein the first tongue is configured to matingly and slidingly engage with the second groove to selectively interlock the first fiber optic splitter module with the second fiber optic splitter module in a first position, and wherein the second tongue is configured to matingly and slidingly engage with the first groove to selectively interlock the first fiber optic splitter module with the second fiber optic splitter module in a second position.

7. The pair of interlocking fiber optic splitter modules of claim 6, wherein one of the first or second side walls of the first fiber optic splitter module comprises a stop that includes a first surface positioned at a first distance from the first front wall, one of the third or fourth side walls of the second fiber optic splitter module comprises a truncation that includes a second surface positioned at a second distance from the second front wall, and the first and second surfaces are configured to limit relative longitudinal movement between the first and second fiber optic splitter modules.

8. The pair of interlocking fiber optic splitter modules of claim 7, wherein the first and second distances are substantially the same.

9. The pair of interlocking fiber optic splitter modules of claim 6, wherein one of the first or second side walls of the first fiber optic splitter module comprises a detent that is positioned at a first distance from the first front wall, one of the third or fourth side walls of the second fiber optic splitter module comprises an indent that is complementary to the detent and that is positioned at a second distance from the second front wall, and the detent and the indent are configured to cooperate with each other to selectively lock a positioning of the first and second fiber optic splitter modules relative to each other.

10. The pair of interlocking fiber optic splitter modules of claim 9, wherein the first and second distances are substantially the same.

11. The pair of interlocking fiber optic splitter modules of claim 9, wherein the detent is configured to provide a snap-fit with the indent.

12. A fiber optic terminal comprising:
    a frame comprising:
       at least one frame wall; and at least one rail mounted to the at least one frame wall, the at least one rail including at least one interlocking feature extending longitudinally along the at least one rail; and at least one fiber optic splitter module comprising:
  a body including a front wall, a rear wall, and first and second side walls together at least partially defining an interior space, wherein the first side wall includes a tongue extending longitudinally along the first side wall, and wherein the second side wall includes a first groove that is complementary to the tongue;
  an optical splitter positioned in the interior space;
  an input fiber extending through the front wall or the rear wall into the interior space and optically coupled to the optical splitter; and
  a plurality of output fibers extending through the front wall or the rear wall into the interior space and optically coupled to the optical splitter
wherein the at least one interlocking feature of the at least one rail is configured to matingly and slidingly engage with the tongue or the first groove of the at least one fiber optic splitter module.

13. The fiber optic terminal of claim 12, wherein the at least one interlocking feature of the at least one rail comprises at least one tongue extending longitudinally along the at least one rail, and wherein the rear wall of the at least one fiber optic splitter module includes at least one second groove extending longitudinally along the rear wall and configured to matingly and slidingly engage with the at least one tongue of the at least one rail.

14. The fiber optic terminal of claim 12, wherein the at least one rail comprises at least two oppositely disposed rails.

15. The fiber optic terminal of claim 12, wherein each rail of the at least one rail includes at least two adjacent partitions extending longitudinally along the rail to define a space configured to receive a portion of the body of the at least one fiber optic splitter module.

16. The fiber optic terminal of claim 12, wherein the at least one frame wall includes a top frame wall and the at least one rail includes a top rail mounted to the top frame wall, and wherein the at least one fiber optic splitter module extends downwardly from the top rail.

17. The fiber optic terminal of claim 12, wherein the at least one frame wall includes a bottom frame wall and the at least one rail includes a bottom rail mounted to the bottom frame wall, and wherein the at least one fiber optic splitter module extends upwardly from the bottom rail.

18. The fiber optic terminal of claim 12, wherein the at least one fiber optic splitter module comprises a pair of fiber optic splitter modules interlocked by the tongue of one of the fiber optic splitter modules cooperating with the first groove of the other of the fiber optic splitter modules.

19. The fiber optic terminal of claim 12, wherein the at least one rail further includes at least one pair of mounting prongs and the at least one frame wall includes at least one aperture configured to receive the at least one pair of mounting prongs for mounting the at least one rail to the at least one frame wall.

20. The fiber optic terminal of claim 12, further comprising:
  an adapter cradle slidingly engaged with the at least one rail, the adapter cradle comprising a cradle body including a rear inner surface and first and second side inner surfaces together at least partially defining a cavity configured to receive the body of the at least one fiber optic splitter module, wherein one of the first or second side inner surfaces includes at least one interlocking feature extending longitudinally along the first or second side inner surface and configured to matingly and slidingly engage with the tongue or the first groove of the at least one fiber optic splitter module.

21. The fiber optic terminal of claim 20, wherein one of the first or second side inner surfaces of the adapter cradle comprises an indent, one of the first or second side walls of the at least one fiber optic splitter module comprises a detent that is complementary to the indent, and the indent and the detent are configured to cooperate with each other to selectively lock a positioning of the adapter cradle and the at least one fiber optic splitter module relative to each other.

22. The fiber optic terminal of claim 12, further comprising:
  a tray mounted to the frame, the tray comprising:
    a platform extending from a front end to a rear end and configured to cooperate with the body of the at least one fiber optic splitter module; and
    at least one side wall extending along the platform and including a bracket extending longitudinally along the bracket and configured to matingly and slidingly engage with the first groove of the at least one fiber optic splitter module.

23. The fiber optic terminal of claim 22, wherein the tray further comprises:
  a rear wall extending along the rear end of the platform and configured to cooperate with the rear wall of the at least one fiber optic splitter module; and
  at least one tab extending from the rear wall of the tray toward the front end of the platform and spaced apart from the platform to define a space for receiving a portion of the at least one fiber optic splitter module.

* * * * *